United States Patent [19]

Murphy et al.

[11] Patent Number: 4,987,330
[45] Date of Patent: Jan. 22, 1991

[54] ROTOR LAMINATION ASSEMBLY FOR A DYNAMOELECTRIC MACHINE

[75] Inventors: John W. Murphy, Kettering; Albert G. Haitz, Dayton; Kenneth L. Myers, Kettering, all of Ohio

[73] Assignee: General Motors Corporation, Detroit, Mich.

[21] Appl. No.: 465,294

[22] Filed: Jan. 16, 1990

[51] Int. Cl.⁵ .............................................. H02K 1/00
[52] U.S. Cl. .................................... 310/217; 310/42; 310/91; 310/261; 403/356; 403/359
[58] Field of Search .................. 310/216, 217, 42, 91, 310/261, 262, 264, 265, 267, 263, 268, 269; 29/598, 609; 403/356, 358, 359, 383; 336/210

[56] References Cited

U.S. PATENT DOCUMENTS

| | | | |
|---|---|---|---|
| 1,816,552 | 7/1931 | Trusler | 403/356 |
| 2,783,404 | 2/1957 | Appenzeller | 310/217 |
| 3,087,080 | 4/1963 | Isaacson | 310/42 |
| 3,882,336 | 5/1975 | Boyd | 310/264 |
| 4,585,967 | 4/1986 | Mayer | 310/217 |
| 4,614,023 | 9/1986 | Sisk | 29/598 |
| 4,682,069 | 7/1987 | Stahl | 310/261 |
| 4,777,397 | 10/1988 | Parshall | 310/261 |
| 4,833,353 | 5/1989 | Hansen | 310/216 |
| 4,841,186 | 6/1989 | Feigel | 310/216 |

*Primary Examiner*—R. Skudy
*Attorney, Agent, or Firm*—Mark A. Navarre

[57] ABSTRACT

An improved laminated rotor assembly is disclosed which features a novel key/keyway design that prevents lamination reversal while permitting indexing of successive laminae for the distribution of dimensional variations thereof. There are multiple, symmetrically oriented keyways, each keyway having an identical asymmetrical profile. The symmetrical distribution of identical profile keyways permits indexing of successive laminae, and the asymmetrical keyway profiles prevent lamination reversal. In the preferred embodiment, two or three keyways are employed, each key and keyway being formed in the shape of a step having at least two different radial dimensions.

2 Claims, 1 Drawing Sheet

ROTOR LAMINATION ASSEMBLY FOR A DYNAMOELECTRIC MACHINE

This invention relates to a laminated dynamoelectric rotor assembly, and more particularly to a keyway design for improving the rotor balance and manufacturability.

BACKGROUND OF THE INVENTION

In the manufacture of a dynamoelectric machine rotor, a large number of core material laminae are assembled onto the rotor shaft. A specified orientation of the laminae is required to properly define the rotor poles and conductor./winding slots, and such orientation is commonly achieved by keying the laminae to the shaft. That is, a key or ridge is formed on the shaft along the length of the lamination stack, and a complementary keyway is formed on each lamination.

Typical examples of conventional practice are shown in FIGS. 1a14 1b. In FIG. 1a, a single key 10 and keyway 12 is employed. A peculiar disadvantage of this approach is that the keyway 12 on the rotor shaft 14 does not prevent reversing of the laminae 16. As a result, the laminae 16 may not stack properly, and there may be some misalignment of the openings 18 of the assembly. Moreover, dimensional variations in the laminae 16 stack up or accumulate since the angular orientation of each lamination is identical. This results in rotor imbalance and may cause difficulties in winding insertion or casting.

In the rotor of FIG. 1b, a second key 20 and keyway 22 are employed at an asymmetric orientation to prevent laminae reversal. However, the cumulative lamination stack-up, and the attendant manufacturing difficulties, still occur.

In other known designs, multiple keys and keyways are formed symmetrically about the rotor shaft to distribute the dimensional variation by indexing successive laminations. See, for example, Mayer et al. U.S. Pat. No. 4,585,96

SUMMARY OF THE INVENTION

The present invention is directed to an improved laminated rotor assembly featuring a novel key/keyway design which prevents lamination reversal while permitting indexing of successive laminae for the distribution of dimensional variations thereof. According to the invention, the above object is achieved through the use of multiple, symmetrically oriented keyways, each keyway having an identical asymmetrical profile. The symmetrical distribution of identical profile keyways permits indexing of successive laminae, and the asymmetrical keyway profiles prevent lamination reversal.

In the illustrated and preferred embodiment, two or three keyways are employed, each key and keyway being formed in the shape of a step having at least two different radial dimensions. This has the effect of increasing the key-to-keyway contact area, and hence, the alignment accuracy during manufacture and assembly operations.

DETAILED DESCRIPTION OF THE DRAWINGS

Figure 1A:
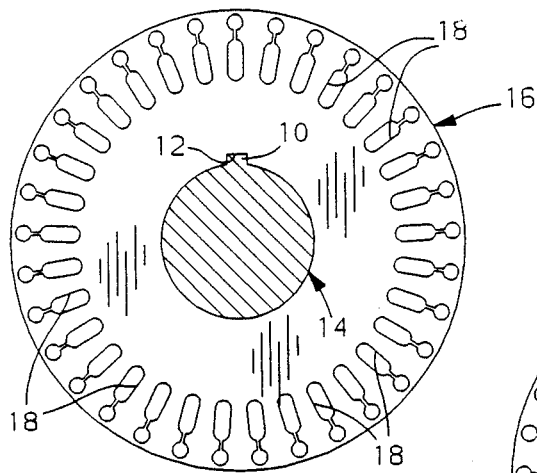
FIGS. 1a-1b depict conventional prior art rotor lamination assemblies.
Figure 1B:
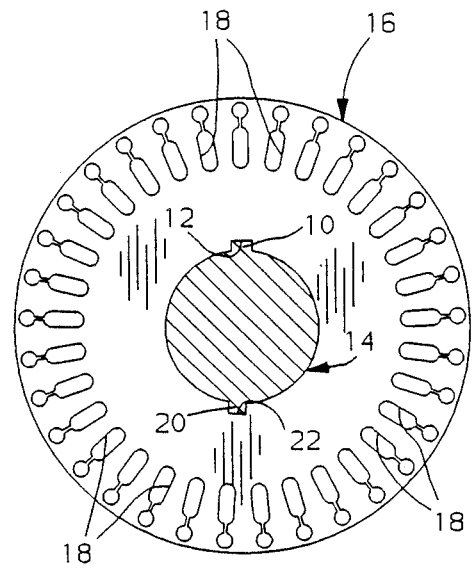
Figure 2A:
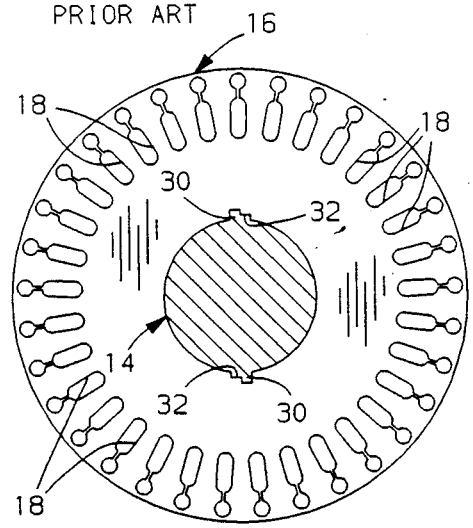
FIGS. 2a-2b depict rotor lamination assemblies according to this invention.
Figure 2B:
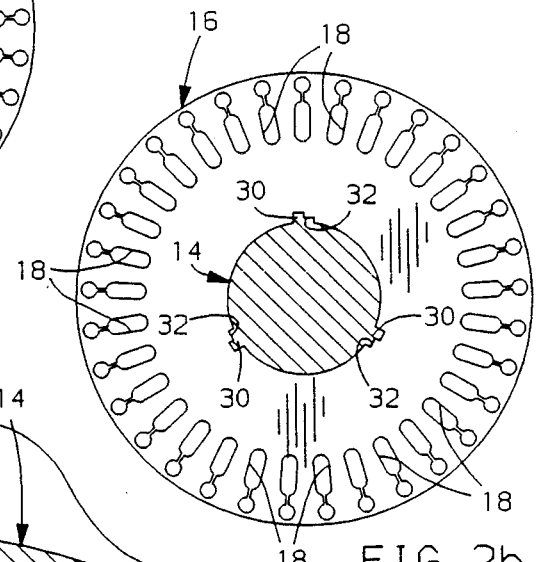
Figure 3:
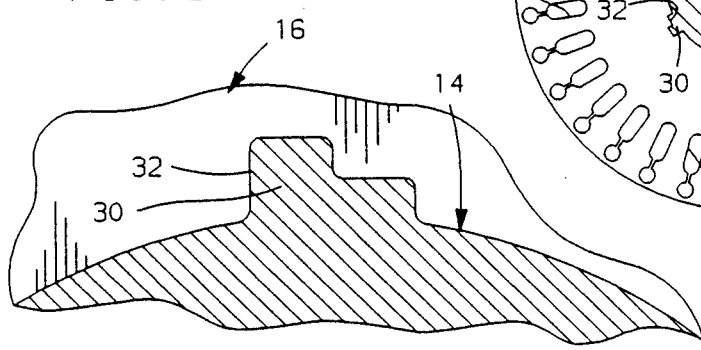
FIG. 3 is an enlarged view of a key and keyway shown in FIGS. 2a-2b.

Referring to the drawings, and more particularly to FIGS. 2a-2b, the reference numeral 16 generally designates a rotor lamination according to this invention. Various openings 18 are provided for the insertion or casting of rotor windings or conductor bars following assembly of the rotor core. Axial alignment of the openings is ensured by maintaining close control of the tolerances between the keys 30 formed on the rotor shaft 14 and the complementary keyways 32 formed on each lamination 16.

According to this invention, the keys 30 and complementary keyways 32 are formed with identical asymmetrical profiles to prevent inadvertent reversal of laminae during manufacture of the rotor. This promotes closer and more consistent spacing between successive laminae, which is especially important when the rotor conductors are formed by metal casting techniques. In the preferred embodiments of FIGS. 2a and 2b, the keys 30 and keyways 32 are formed in the shape of a step having at least two different radial dimensions. This has the additional effect of increasing the key-to-keyway contact area, and hence, the alignment accuracy during manufacture and assembly of the rotor.

Multiple keys 30 and keyways 32 are symmetrically distributed around the outer and inner circumferences, respectively, of the rotor shaft 14 and the laminae 16 to permit a random or scheduled angular indexing of the laminae during assembly of the rotor. The embodiment of FIG. 2a features two sets of keys 30 and keyways 32, separated by 180 mechanical degrees. The embodiment of FIG. 2b features three sets of keys 30 and keyways 32, adjacent sets being separated by 120 mechanical degrees. As indicated above, the indexing of successive laminae in a rotor angularly distributes the lamination non-uniformities, resulting in a more even stack height, better alignment of the openings 18 and improved balance of the finished product.

While this invention has been described in reference to the illustrated embodiment, it is expected that various modifications will occur to those skilled in the art. By way of example, the key and keyway could be reversed—that is, the key could be formed on the laminae and the keyway on the rotor shaft. By way of further example, the design could be applied to a so-called inside-out rotor in which the laminae are disposed inside a hollow cylindrical rotor shaft. In this regard, it should be understood that arrangements incorporating such modifications may fall within the scope of this invention, which is defined by the appended claims.

We claim:

1. A dynamoelectric machine rotor in which a plurality of laminations are supported on a peripheral surface of a shaft, the shaft having two or more axially extending keys formed on said peripheral surface, and the laminations having complementary keyways which receive the axially extending keys of said shaft to mechanically couple the laminations to the shaft, the improvement wherein:

N sets of asymmetric keys and keyways are symmetrically distributed about the shaft and laminations, each key and keyway being bi-laterally asymmetric about a central radial axis so as to prevent inadvertent reversal of the laminations during assembly of the rotor while permitting angular displacement of juxtaposed laminations.

2. The improvement set forth in claim 1, wherein each key and keyway is formed in the shape of a step having at least two different radial dimensions.